May 23, 1961 P. J. KAMPS 2,985,733

HIGH LEAKAGE RESISTANCE ELECTROMAGNETIC RELAY

Filed Feb. 19, 1959

2 Sheets-Sheet 1

INVENTOR
P. J. KAMPS
BY
Charles Scott Phelan
ATTORNEY

INVENTOR
P. J. KAMPS
BY
Charles Scott Phelan
ATTORNEY

United States Patent Office 2,985,733

Patented May 23, 1961

2,985,733

HIGH LEAKAGE RESISTANCE ELECTROMAGNETIC RELAY

Paul J. Kamps, Middlesex, N.J., assignor to Bell Telephone Laboratories, Incorporated, New York, N.Y., a corporation of New York Filed Feb. 19, 1959, Ser. No. 794,435

9 Claims. (Cl. 200—87)

This invention relates to electromagnetic switching devices, or relays, with unusually high resistance current leakage paths between the relay terminals, or between any one terminal and ground, when the relay is in its switch-open condition.

Electromagnetic relays are generally mounted on some type of chassis with relay terminals projecting through an opening in the chassis to permit underchassis wiring for connecting the relay into an appropriate electric circuit. In order to keep the size of the relays and of such chassis openings to a minimum, it is desirable to locate the relay terminals as closely together as possible. In addition, it has been the practice in many prior art relays to enclose the relay within a dust cover on the top and sides and to seal the end through which the terminals extend with a suitable sealing member in order to keep the relay mechanism clean and in good working order. The end result of arranging relay terminals close together and of sealing the terminal end of the relay enclosure is that the leakage resistance to electric current flow between relay terminals and from any one terminal to ground is reduced sufficiently to become a significant factor to be considered in circuit design.

Surface insulation resistance is the chief source of leakage resistance since the surface resistivity in insulating material is usually much lower than the volume resistivity of the same insulating material. Surface resistivity is a function of the conductivity of a thin film of moisture on the surface of the insulating material. The amount of moisture and the amount of dust or foreign matter in the film have an effect on the conductivity of the film.

A typical surface resistivity for plate glass, for example at 90 percent humidity, is 200 megohms/centimeter. However, relay manufacturers generally do not guarantee a leakage resistance of more than about 100 megohms. In certain circuit applications, such as in certain automatic testing apparatus, leakage resistances of the order of at least one million megohms are required; and relays which are commercially available today will not perform satisfactorily in such applications.

It is therefore a principal object of this invention to increase the leakage resistance of electromagnetic relays.

Another object is to reduce current leakage along the surfaces of insulating materials in electromagnetic relays.

A further object is to arrange the structure of a relay for convenient disassembly and assembly to facilitate the inspection and cleaning thereof.

These and other objects of the invention are realized in an illustrative embodiment thereof in which the supporting and spacing members for contacts within a relay are arranged in a novel manner to provide unusually long surface leakage paths between relay terminals which are mounted close to one another. Glass-enclosed switches contain the relay switching contacts and are removably engaged between the ends of a C-shaped support. The support is slotted through a substantial part of the length thereof; and the relay terminals, which are electrically connected to the switching contacts, are mounted on the support on opposite sides of the slot. The slot thus provides, in a minimum amount of space, long surface leakage paths between the relay terminals while at the same time permitting the relay terminals to be arranged relatively close to one another.

A mounting member, which engages the C-shaped support in one location and is spaced from the support in all other locations, extends to larger dimensions than the support thereby providing means for holding a dust cover in fixed spaced relationship with respect to the switch. Some of the extensions on the mounting member also include means for securing the relay to a chassis. The relay operating coil, including its associated magnetic circuit, is secured to the mounting member at the one location mentioned above and within the compass of the support and the switch. In this manner unusually long leakage paths are provided from any relay terminal to the grounded mounting member.

It is one feature of the invention that the use of a single fastener for securing the basic relay parts together facilitates the process of assembling the relay.

Another feature is that the employment of removable switches and of a mounting member which performs both relay-mounting and cover-spacing functions provides convenient access to the relay parts for the cleaning and inspection thereof without removing the relay from the chassis.

A more complete understanding of the invention may be obtained from a consideration of the following detailed description in connection with the attached drawing in which.

A two-switch embodiment of the relay has been chosen for the purpose of describing and illlustrating the principal features of the invention. However, it is to be understood that the invention applies equally well to relays employing either more or less than two switches.

Figure 1:
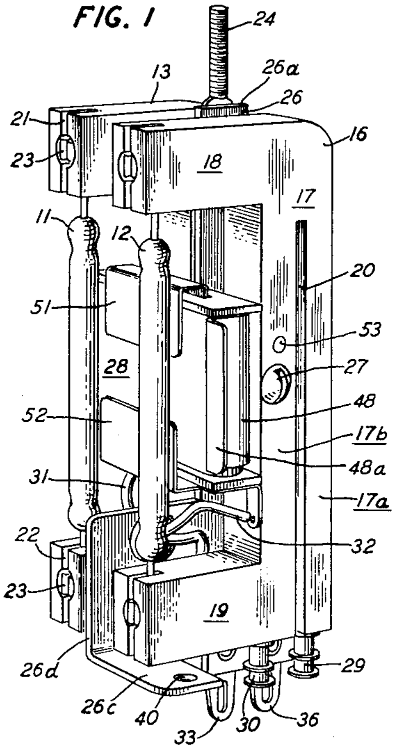
Fig. 1 is a perspective view of the relay mechanism in accordance with the invention.

Referring to Fig. 1, a pair of magnetic reed switches 11 and 12, of the type disclosed in the W. B. Ellwood Patent No. 2,289,830, issued July 14, 1942, are held in fixed positions by the C-shaped support members 13 and 16, respectively. Support members 13 and 16 are made of a suitable insulating material such as Lucite. Each of the support members 13 and 16 includes a back portion 17 interconnecting two end portions 18 and 19 which extend substantially perpendicularly from the ends of the back portion 17 in the same direction. Back portion 17 is characterized by a longitudinal slot 20 extending from one end of the portion 17 through nearly the entire length of the back portion 17 and extending transversely through the entire thickness of the support member 16 as will be hereinafter noted in connection with Figs. 3 and 4. The end of slot 20 opens into the edge of the support member, and slot 20 divides back portion 17 into two parts **17*a* and 17*b*. The part 17*a* is secured to end portion 18 only. The part 17*b* is secured to both end portions 18 and 19. Each of the support members 13 and 16 is further characterized by a slot 21 in each end portion 18 and a slot 22 in each end portion 19 thereof. Each of the slots 21 and 22 is located at the end of its respective member which is remote from back portion 17. Contacts 23 are mounted in each of the slots 21 and 22 for receiving the knife-like terminals of the magnetic reed switches 11 and 12**.

Both of the support members 13 and 16 are secured to a mounting member 26 by means of a bolt 27. Switches 11 and 12 are operated by an electromagnet 28 which is also secured to the mounting member 26 and which is arranged within the compass of the support members and their respective magnetic reed switches. No part of the electromagnet 28, including its pole pieces, contacts the envelopes of switches 11 and 12. The manner of securing the various parts to the mounting member 26 will be hereinafter described in greater detail.

Each of the contacts 23 in slots 21 is electrically connected to a relay terminal 29 secured to the bottom of part 17*a* of the same support member by means of a lead passing through portion 18 and part 17*a* as will be subsequently described in greater detail. Each of the contacts 23 in the slots 22 is connected to a relay terminal 30 which is secured to the lower portion of support part 17*b* of the same support member by means of a lead passing through end portion 19 as will be subsequently described in greater detail.

Relay terminals 29 and 30 are located on opposite sides of slot 20. In the illustrated embodiment the slot 20 opens into the edge of the support member and terminals 29 and 30 are arranged adjacent to the open end of the slot in order to utilize to the fullest extent the elongated leakage path provided by the slot. Other arrangements of the slot in a support member may, of course, make a different terminal arrangement more practical. In any event, it is desirable to make slot 20 as long as possible so that the current leakage paths along the surfaces of a support member, either between the relay terminals 29 and 30 or between either relay terminal and ground, are as long as possible in the available space. In addition, a support member should include a minimum amount of horizontal area that can collect dust. The dust would reduce the surface resistivity and necessitate more frequent cleaning of the support than is required for support members 13 and 16 which have substantially smooth vertical surfaces.

The electromagnet 28 is provided with a pair of leads 31 and 32 for supplying operating potential thereto. The leads 31 and 32 extend from the magnet through an aperture in mounting member 26, in opposite directions, to the soldering lugs 33 and 36. These leads are crossed through mounting member 26 to provide positive dressing thereof to eliminate the possibility that the leads may touch one of the support members 13 or 16 and thereby change the effective lengths of known surface leakage paths to terminals 29 and 30. These leads are illustrated in Fig. 1 only and are not shown in the other figures in order to avoid unnecessary complication of the drawing.

Figure 2:
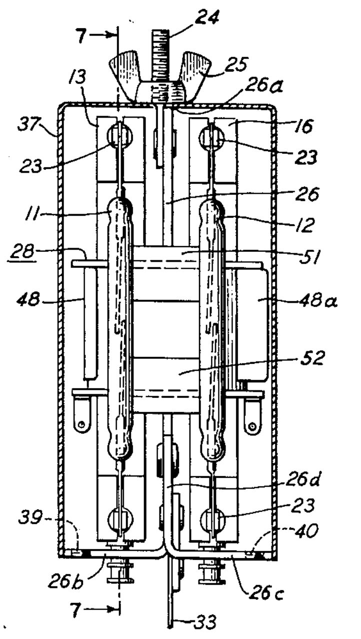
Figs. 2 and 3 are front and side elevations, partly in section, of the relay.

Referring to Fig. 2, the front elevation of the relay shows a dust cover 37 assembled on the relay. The magnetic reed switching contacts in switches 11 and 12 are here shown by broken lines. Cover 37 is supported in vertical spaced relationship with respect to the relay mechanism by means of a shoulder 26*a* on the top of mounting member 26. The upper portion of mounting member 26 is provided with a threaded extension 24 and a wing nut 25 for restraining vertical movement of the entire cover and restraining lateral movement of the upper portion of the cover. The lower portion of mounting member 26 is provided with oppositely transversely extending feet 26*b* and 26*c* which engage the lower portion of dust cover 37 and thereby restrain horizontal movement of cover 37 in the direction which is transverse to the planes of the support members 13 and 16. The feet 26*b* and 26*c* are in turn provided with threaded holes 39 and 40 for engaging suitable fasteners (not shown) to secure the relay to a chassis.

Figure 3:
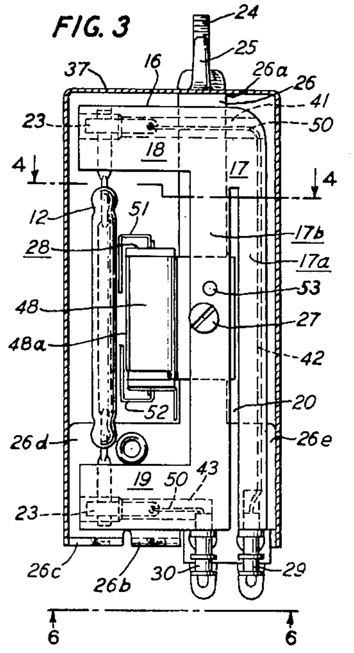

Referring to Fig. 3, there are shown here on mounting member 26 two oppositely transversely extending flanges 26*d* and 26*e* which engage the dust cover 37 and thereby restrain horizontal movement of cover 37 in the direction which is parallel to the planes of the support members 13 and 16. Also, in Fig. 3, it can be seen that the slot 20 in support member 16 extends completely through the transverse dimension thereof as hereinbefore noted in connection with Fig. 1. Broken lines in support member 16 outline a passage 41 in end portion 18 which connects the slot 21, also shown by broken lines in this figure, with a longitudinal groove 42, also shown by broken lines, in back portion 17 and part 17*a*. The groove 42 connects passage 41 to relay terminal 29. Similarly, there is shown by broken lines a passage 43 in end portion 19 which connects the slot 22 to the relay terminal 30. The passages 41 and 43 and the groove 42 provide spaces through which connecting leads 50 are passed to interconnect the contacts 23 with terminals 29 and 30 as hereinbefore mentioned.

Figure 4:
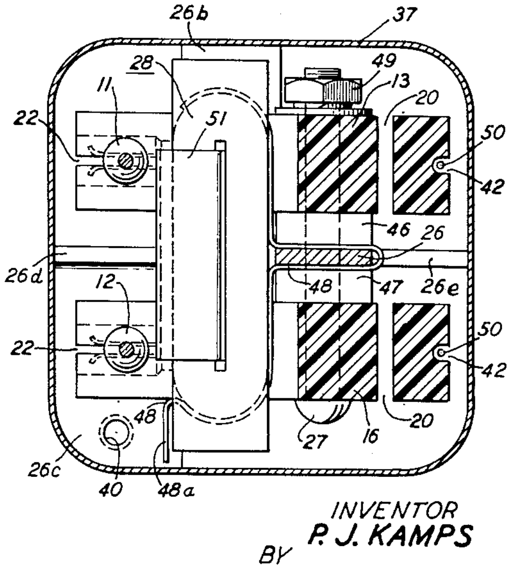
Fig. 4 is a sectional view of the relay taken along the lines 4—4 in Fig. 3.

Referring to Fig. 4, the sectional view taken along the lines 4—4 in Fig. 3 illustrates the arrangement of the support members 13 and 16 with respect to the electromagnet 28. The support members 13 and 16 include insulating blocks 46 and 47, respectively, projecting from the sides thereof for spacing the support members with respect to the mounting member 26. A spring clip 48 extends around three sides of the windings of electromagnet 28 and also around three sides of the central portion of mounting member 26. The bolt 27 passes through support member 16, insulating block 47, spring clip 48, mounting member 26, spring clip 48 again, insulating block 46, and support member 13. The bolt 27 is provided with a nut 49 for securing the aforementioned parts in position. A tab 48*a* on the lower end of spring clip 48 is provided to facilitate the opening of clip 48 to remove electromagnet 28.

Certain features of the relay are clearly illustrated in the sectional view of Fig. 4. The four extensions 26*b* through 26*e* of mounting member 26 are illustrated and their functions in engaging the four sides of dust cover 37 are clearly shown. Similarly, the spacing of support members 13 and 16 on all sides from cover 37 is apparent and the engagement of these support members with mounting member 26 only at the location of insulating blocks 46 and 47 is also clearly shown. Slots 20 and connecting leads 50 in grooves 42 are also shown.

Summarizing now with respect to Figs. 1 through 4, the mounting member 26 is provided with four extensions 26*b* through 26*e* which engage the sides of dust cover 37 to prevent the lateral movement thereof. The member 26 is also provided with a shoulder 26*a* which cooperates with wing nut 25 for preventing vertical movement of dust cover 37. The support members 13 and 16 are each completely spaced from dust cover 37. The only elements contacted by support members 13 and 16 are their own magnetic reed switches and their respective insulating blocks 46 and 47 by means of which (together with bolt 47 and nut 49) they are secured to the central portion of mounting member 26.

Each of the support members 13 and 16 includes in the edge surface thereof a re-entrant portion forming the slot 20 which extends through a substantial portion of the length of the support member. The slot 20 increases the length of the electric current leakage path along the surface of the support member between the terminals 29 and 30. If it is assumed that the dust cover and the mounting member 26 are both grounded in any electric circuit application in which this relay might be used, it is clear that a surface leakage path for electric current from any relay terminal to ground must traverse the full length of the support member surface from such terminal to the corresponding spacing block of the support member and across the surface of that block to mounting member 26. In one relay constructed as hereinbefore described with typical Ellwood switches in which the contacts 23 in each support member were 2⅝ inches apart, the shortest surface distance from a relay terminal to a portion of the mounting member 26 was greater than 1½ inches. This relay employed Lucite support members and was characterized by a measured leakage resistance from the relay terminal to ground of greater than one million megohms. This particular example represents an improvement of four orders of magnitude over the known commercially available relays hereinbefore mentioned.

With respect to support members 13 and 16, the surfaces thereof are characterized by smoothness and simplicity of configuration. Complex patterns of surface rippling are not required in order to achieve the desired elongated surface leakage paths.

Referring once more to Fig. 4, the assembled relationship of the various relay parts is shown and it can be seen that upon the removal of cover 37 and bolt 27 the support members 13 and 16 may be readily separated from the electromagnet 28 and the mounting member 26.

Figures 5, 6, 7, 8:
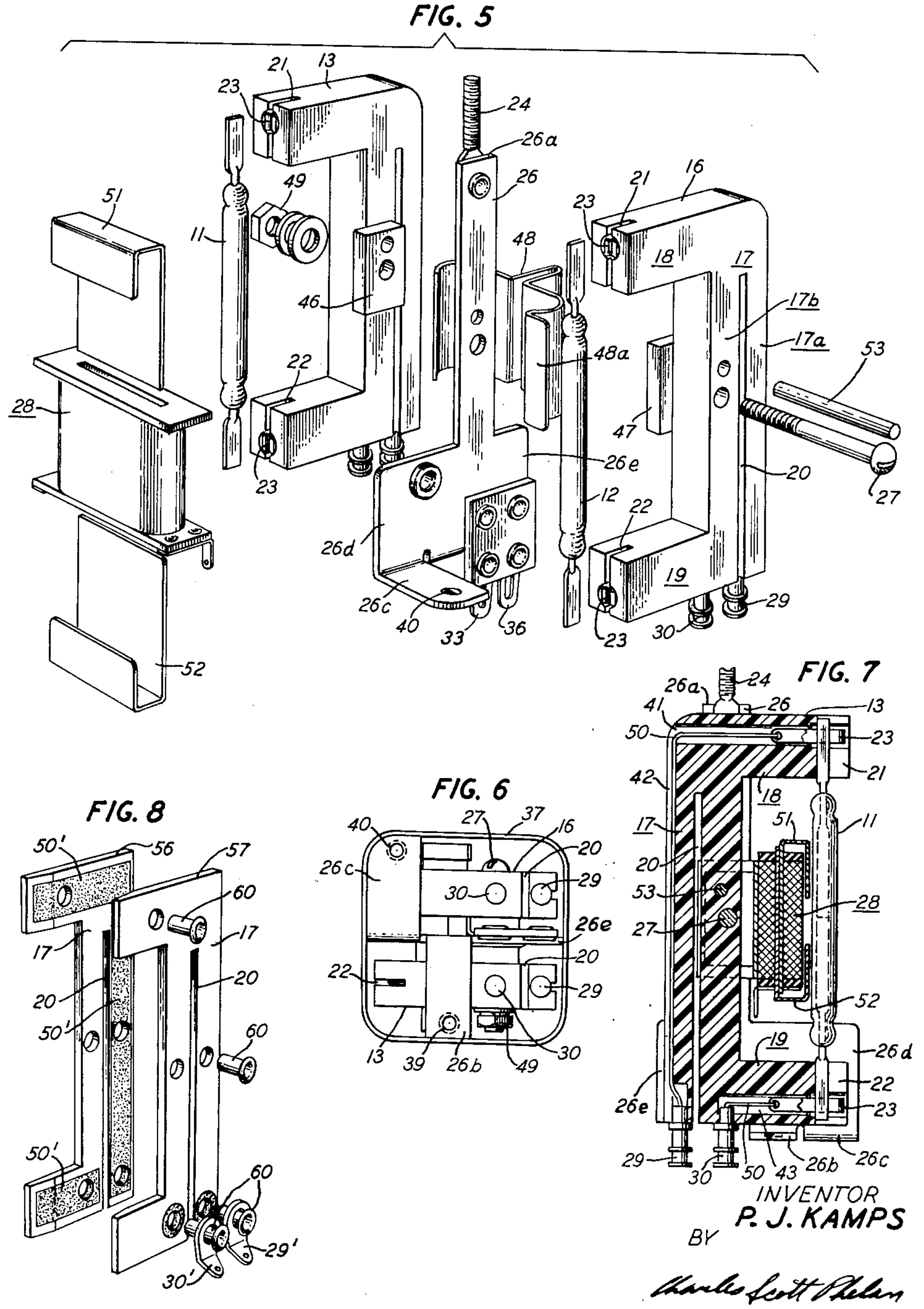
Fig. 5 is an exploded drawing of the relay parts.
Fig. 6 is a bottom view of the assembled relay.
Fig. 7 is a side elevation, partly in section, of the relay mechanism taken along the lines 7—7 in Fig. 2.
Fig. 8 is a view of a modified switch support member.

Referring to Fig. 5, the exploded view of the relay mechanism illustrates the relationship of the relay parts with one another. The electromagnet 28 is provided with two pole pieces 51 and 52 which may be inserted into opposite ends of the magnet winding. The pole pieces overlap therein, as illustrated in Fig. 7, and include reversely bent end portions for directing magnetic flux around the side of magnet 28 which is closest to the reed switches 11 and 12.

The ease with which the relay can be assembled in a small number of simple operations is evident from Fig. 5. Pole pieces 51 and 52 are inserted into magnet 28. Spring clip 48 is applied to enclose the central portion of mounting member 26. Support members 13 and 16 are positioned adjacent to mounting member 26. Bolt 27 is inserted to secure clip 48 and support members 13 and 16 to mounting member 26. Magnet 28 is inserted into clip 48. Switches 11 and 12 are inserted into their respective supporting members 13 and 16, and dust cover 37 is assembled onto the relay. A pin 53 is provided for insertion through supporting members 13 and 16, clip 48 and mounting member 26 to be frictionally held therein for preventing the rotation of the relay parts around bolt 27. However, this pin is not essential to the invention since the same function could be readily performed, for example, by providing bolt 27 with a suitable non-circular cross section.

The construction of the relay permits the disassembly thereof while mounted on a chassis with only enough space to draw out bolt 27. Even the latter space requirement could be reduced by providing a different type of fastening member. In addition, the structural arrangement facilitating convenient disassembly and reassembly enables one to replace individual defective relay parts if any should be found and to remove the switches 11 and 12 for easy cleaning of the surfaces of the switches and of the support members 13 and 16. Periodic cleaning of those surfaces keeps surface leakage resistance at a high level.

Referring to Fig. 6, the bottom view of the relay shows in an unobstructed manner the transversely extending foot members **26*b* and 26*c*. In addition, the flange portion 26*e* is also shown to illustrate clearly the manner in which the lateral extensions of mounting member 26 hold the relay elements in spaced relation with respect to cover 37 and the manner in which relay terminals 29 and 30** project through the bottom of the relay with no short surface leakage paths therebetween. It will be noted that no sealing material or member is applied to the bottom of the relay. Such members have been found to contribute low surface leakage resistance paths which the present invention seeks to avoid. Obviously a certain amount of dust and moisture may enter the relay enclosure through the openings in the bottom. However, the unique structure of the relay which enables the convenient disassembly thereof without the removal of the relay from its chassis mounting position makes it quite easy to open the relay rapidly for cleaning.

Referring to Fig. 7, the support member 13 is illustrated in partial section to show more clearly the passages 41 and 43, the groove 42, and the connecting leads 50 which extend therethrough for electrically connecting the contacts 23 to the relay terminals 29 and 30. The soldering lugs 33 and 36 have been left out of Fig. 7 to avoid unnecessary complication of the drawing. The current leakage paths for electric current along a support member surface may be easily traced in Fig. 7. In the illustrated embodiment, the shortest current leakage path between relay terminals 29 and 30 with switch 11 open would be along the surface of the envelope of switch 11. Any other leakage path between the two relay terminals must of necessity be of a length which is at least equal to the length of the slot 20 in the support member 13. Thus, the shortest surface leakage paths between relay terminals are substantially longer than the shortest leakage path from either terminal to ground as hereinbefore described in connection with Figs. 1 through 4.

In Fig. 8 there is illustrated a modification of a support member which may be more suitable for mass production manufacturing methods than is the support member hereinbefore discussed and illustrated, for example, in Fig. 7. The support member of Fig. 8 includes two C-shaped slabs 56 and 57 of insulating material. Each slab includes a longitudinal slot 20 in the back portion 17 thereof as hereinbefore described in connection with the members 13 and 16. The slabs are designed to be secured together and the facing surfaces thereof are beveled at the extremities of the end portions to form the switch-receiving slots in the end members. Films of conducting material are deposited on the facing surfaces of slabs 56 and 57 to provide connecting leads 50′ corresponding to the connecting leads 50 hereinbefore mentioned. In this embodiment relay terminals 29′ and 30′ in the form of soldering lugs are employed since they can be easily used in connection with the deposited conducting films. The conducting material on the facing surfaces of slabs 56 and 57 is extended through holes in the two slabs 56 and 57 to provide connection directly to terminals 29′ and 30′. The slabs may be secured together by suitable fasteners such as the rivets 60 which are illustrated in Fig. 8.

Although this invention has been described with respect to particular embodiments thereof it is to be understood that additional embodiments and modifications which are apparent to those skilled in the art are included within the spirit and scope of the invention.

What is claimed is:

1. A support of high surface leakage resistance for a switching device, said support comprising a C-shaped member of insulating material having a longitudinal slot through a substantial portion of the length thereof, switch-receiving means in each end of said member, two terminals mounted on said member on opposite sides of said slot so that the shortest surface leakage path between said terminals is longer than the straight-line distance therebetween, and means electrically connecting each of said switch-receiving means to a different one of said terminals.

2. A high surface leakage resistance support for a switching device, said support having a back portion and two laterally extending end portions forming a C-shaped configuration, said support also having a longitudinal slot in said back portion through a substantial portion of the length thereof in a plane which is generally perpendicular to the plane of said end portions, one end of said slot opening into one edge of said support, switch-receiving means in each end of said support, a pair of terminals mounted on said support adjacent to said one end and on opposite sides of said slot, and means electrically connecting each of said switch-receiving means to a different one of said terminals.

3. The support in accordance with claim 2 in which said C-shaped support comprises two C-shaped portions each having a back portion and two end portions extending substantially perpendicularly therefrom on the same side, and means for securing said two portions together with said connecting means therebetween to form said C-shaped support.

4. An electromagnetic relay comprising an electromagnetic switching device, a support for said device, said support having surface paths for current leakage which are at least as long as the surface paths for current leakage between the terminals of said device in its switch-open condition, said support comprising a C-shaped member having a back portion and two end portions extending laterally from said back portion, said back portion having a longitudinal slot through a substantial portion of the length thereof, means for supporting said device between the extremities of said C-shaped member, a pair of relay terminals secured to said C-shaped member on opposite sides of said slot, means for electrically connecting each of said supporting means to a different one of said terminals, a cover enclosing said relay on the top and sides thereof, mounting means for said relay, means for securing said C-shaped member in spaced relation with respect to said mounting means at all points except a securing point, said mounting means comprising cover supporting portions extending beyond said C-shaped member for holding said cover in spaced relation with respect to said support, and at least one of said cover supporting portions including means for mounting said relay on a chassis.

5. Improved means for assembling a two-terminal electromagnetic switching device adjacent to its operating coil within an enclosure, the improved means comprising a C-shaped member for supporting said device between the extremities thereof, said member having a slot through a substantial portion of the length thereof, means at the extremities of said C-shaped member for engaging the terminals of said device, two terminals secured to said member on opposite sides of said slot, electric connecting means extending along said member from each of said terminals to different ones of said engaging means, a mounting member secured to said C-shaped member at a point substantially midway between the extremities of said C-shaped member and spaced therefrom except at said point, means for detachably engaging said operating coil within the compass of said C-shaped member and said device, the last-mentioned means including a clip secured to said mounting member at said securing point, and said mounting member including means independent of said connecting means for holding said enclosure in fixed spaced relation with respect to said switching device.

6. In an electromagnetic relay comprising a glass-enclosed magnetic reed switch having two terminals, an electromagnet for operating said switch, a conductive dust cover for enclosing the top and sides of said switch and said electromagnet, and first and second relay terminals extending through an opening in the bottom of said dust cover, the improvement in means for supporting said switch in spaced relation with respect to said cover comprising a C-shaped support member having a back portion and two laterally extending end portions, the back portion of said support having a longitudinal slot through the entire width thereof in a plane which is substantially perpendicular to the end portions thereof and extending from the bottom of said member upward through a substantial part of the length thereof, individual contact means mounted at the extremity of each of said end portions remote from said back portion for engaging said switch terminals, means for securing said first relay terminal to the bottom of said back portion adjacent to the bottom one of said end portions, means for securing said second relay terminal to the bottom of said back portion on the opposite side of said slot from said first relay terminal, means electrically connecting said first relay terminal to the contact means in said bottom end portion, means electrically connecting said second relay terminal to the contact means in the upper one of said end portions, relay mounting means comprising a vertical member having two oppositely extending horizontal feet secured to the lower end thereof, means for securing said C-shaped support member to said vertical member substantially parallel thereto and spaced therefrom, said securing means engaging said C-shaped member in said back portion substantially midway between said end portions, said vertical member having vertical and lateral extensions, including said feet, which extend beyond said C-shaped member into engagement with said dust cover for holding said cover in fixed spaced relation with respect to said switch and said relay terminals.

7. A high surface leakage resistance support for a switching device, said support comprising a C-shaped member having a back portion and two laterally extending end portions, the edge surface of said member having a re-entrant portion forming a substantially smooth-surfaced vertical slot in said back portion, switch-receiving means in each end of said member, a pair of terminals mounted on said member on opposite sides of said re-entrant portion, and means electrically connecting each of said switch-receiving means to a different one of said terminals.

8. A support for a switching device, said support comprising a C-shaped member of insulating material having a re-entrant portion in the edge surface thereof, said re-entrant portion forming a substantially smooth-surfaced slot which extends through a substantial portion of the length of said member.

9. A support for a switching device, said support comprising a C-shaped insulating member having a re-entrant portion in the edge surface thereof, switch-receiving means in each end of said member, the total surface length of said portion being substantially longer than the straight-line distance between said switch-receiving means, two terminals mounted on said member on opposite sides of said re-entrant portion, and means electrically connecting each of said switch-receiving means to a different one of said terminals.

References Cited in the file of this patent

UNITED STATES PATENTS

| | | |
|---|---|---|
| 2,318,405 | Leveridge | May 4, 1943 |
| 2,378,986 | Dickten | June 26, 1945 |
| 2,804,519 | Slonneger | Aug. 27, 1957 |